Jan. 21, 1964
H. SVANOE
3,118,731
CONCENTRATION OF PHOSPHORIC ACID
Filed Oct. 28, 1959
FIG. I
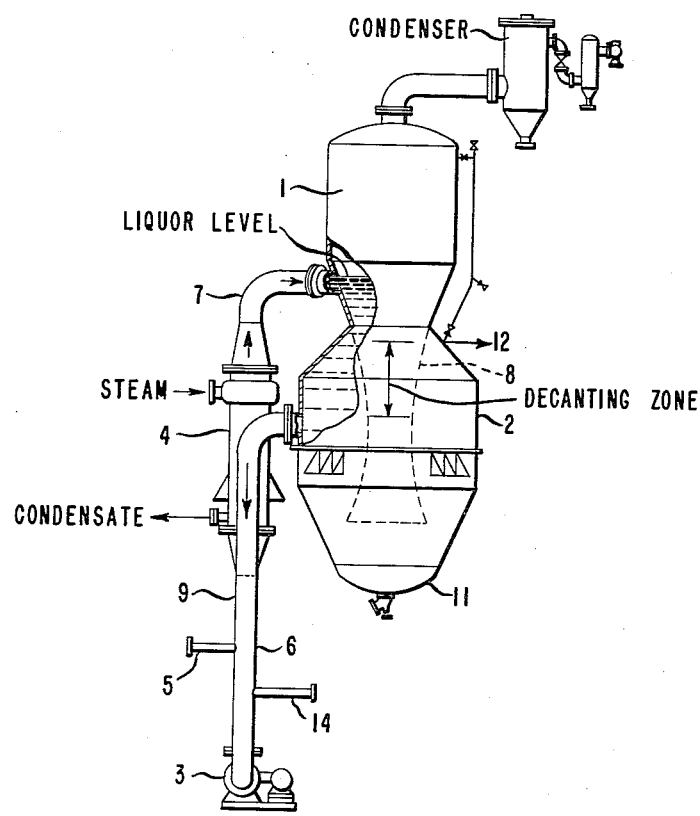
FIG. II
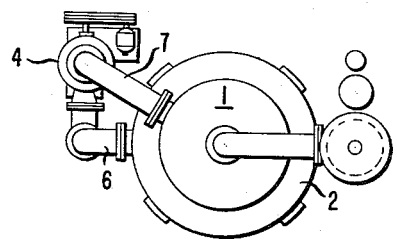
INVENTOR
HANS SVANOE
BY
ATTORNEY

United States Patent Office 3,118,731
Patented Jan. 21, 1964

3,118,731
CONCENTRATION OF PHOSPHORIC ACID
Hans Svanoe, Warren, Pa., assignor to Struthers Scientific and International Corporation, New York, N.Y., a corporation of Delaware
Filed Oct. 28, 1959, Ser. No. 849,345
4 Claims. (Cl. 23—165)

This invention relates to an improved process for the preparation of phosphoric acid and more particularly to its preparation by an efficient so-called "wet process" in which phosphate containing minerals are reacted with sulfuric acid and the weak phosphoric acid obtained concentrated.

In the manufacture of phosphoric acid, in accord with the "wet process," in which phosphate rock (and other suitable phosphorous containing ores such as degreased and calcined bones and the like) is ground in a mill to a powder, the powder charged, together with sulfuric acid into tanks fitted with agitators, in which the phosphorous containing material is converted to phosphoric acid and calcium sulfate. The phosphoric acid is thereafter recovered from the calcium sulfate by the use of filter beds or continuously operated filter equipment. The recovered weak phosphoric acid is then subjected to a process for increasing the concentration of the acid.

Customarily, and especially in the older plants, the weak phosphoric acid is concentrated in evaporators by means of steam coils in lead-lined vessels. In other plants the acid is passed down evaporator towers countercurrent to upwardly flowing hot gases. More recently hot air evaporators, oil gas evaporators, using outside tube bundles and other types of equipment have been employed to improve efficiency and to remove the excess water from the acid. Such equipment since it is operated in the presence not only of phosphoric acid but also sulfuric acid in various degrees of dilution and at elevated temperature is subject to corrosion. Cast lead, rubber lined steel, stainless steel and other so-called non-corrosive materials of construction are used to resist this corrosion. Moreover, an ever present problem in the concentration of phosphoric acid is the tendency of the many dissolved impurities particularly calcium sulfate and the fluosilicates to precipitate on the inside of the evaporators and other equipment and especially on tubular surfaces. In accord with the present invention means are provided for on the one hand reducing corrosion problems on another freeing such systems from unconscionable incrustations on heater, evaporator and like surfaces, and on another improving the efficiency of the manufacture of phosphoric acid by the "wet process" and related processes.

Objects of the present invention are to provide processes for; improving the concentration of phosphoric acid, inhibiting the deposition of sulfates and fluosilicates on heater surfaces during the evaporation of weak phosphoric acid; reducing the concentration of free sulfuric acid in a phosphate rock, sulfuric acid reaction mixture; converting free sulfuric acid in a phosphate rock reaction product during concentration to calcium sulfate and releasing potential phosphoric acid; lowering the partial pressure of an evaporating phosphoric acid solution; concentrating phosphoric acid to higher concentrations at lower temperatures; improving the overall wet process for the concentration of phosphoric acid; and widening the choice of materials of construction that can be used in the concentration of phosphoric acid. The above and other objects of the invention will be described hereinafter.

In accord with one feature of the invention, phosphoric acid is concentrated from the reaction product of sulfuric acid with calcium phosphate containing minerals or rock, degreased and calcined bones, and the like by a regulated evaporation process in which the sulfuric acid content of the evaporating reaction mixture is reduced by the addition of calcium phosphate and more especially mono- and/or di-calcium phosphate. By this feature of the process phosphoric acid can be manufactured with the same or higher concentrations at lower temperatures at higher rates of evaporation and with reduced corrosion.

The addition of the phosphates of calcium preferably in solution of phosphoric acid in accord with the invention results in these reactions:

(A) $H_2SO_4 + CaH_4(PO_4)_2 \rightarrow CaSO_4 + 2H_3PO_4$
(B) $H_2SO_4 + CaHPO_4 \rightarrow CaSO_4 + H_3PO_4$
(C) $3H_2SO_4 + Ca_3(PO_4)_2 \rightarrow 3CaSO_4 + 2H_3PO_4$ By the equations it is seen that mono-, di-, and tricalcium phosphates are converted to calcium sulfate and phosphoric acid in excess sulfuric acid. These involved reactions that take place in accord with the invention during the evaporation step of the process are, of course, simplified by the equations.

The overall reaction in a phosphoric acid plant is the tricalcium phosphate in phosphate rock and sulfuric acid to give soluble phosphoric acid and insoluble calcium sulfate (cf. my U.S. Patent 2,897,053, issued July 28, 1959). In one step of the process the tricalcium phosphate is dissolved in phosphoric acid. In another step the sulfuric acid completes the reaction. When phosphoric acid occurs in the presence of free sulfuric acid, many materials of construction are rapidly corroded. Optimum yields of phosphoric acid by the "wet process" are, however, realized if there is sufficient free sulfuric acid present i.e. in the order of 2% to 5% or more. During the concentration step of the process such amounts of free sulfuric acid result in high corrosion rates. A further feature of the invention is operation of the process with the high and more efficient amounts of sulfuric acid to give optimum yields of phosphoric acid during the wet process reactions while reducing the sulfuric acid in the concentration step of the process by the addition of mono-, di- or tricalcium phosphate.

A further feature of the process is maintaining a suspension of calcium sulfate and fluosilicate crystals or other crystals during the evaporation step. By the use of controlled amounts of these crystals in the concentrating liquors, supersaturation is released in the form of crystal growth and nucleation, leaving a relatively desupersaturated solution from which the formation of crystal nuclei and resultant deposition of crystals are inhibited.

The invention will be more readily understood by reference to the drawings in which FIG. 1 is a side view and FIG. 2 a top view in partial cut away section illustrating a preferred type of evaporator-crystallizer in which the process of the invention is carried out.

FIG. 1 shows in combination, vaporizer 1, desupersaturation chamber 2, circulating pump 3, and heater 4. A dilute phosphoric acid solution is introduced into the apparatus through feed pipe 5 connected to pipe 6. The feed of weak phosphoric acid containing free sulfuric acid comes into contact in pipe 6 with a circulating slurry concentrate of crystalline solids as calcium sulfate and fluosilicates in phosphoric acid solution and is passed with the concentrate, by circulating pump 3 and pipe 9 into heater 4 where the mixture is heated by steam (as shown) or by any other suitable heating medium such as fuel gas, oil, or the heat from any suitable source. From heater 4 the heated mixture of feed and slurry concentrate is conducted through pipe 7 into vaporizer 1 in which the mixture is subjected to vaporization at any desired pressure, and preferably at pressures between 200 and 50 mm. of Hg absolute. The acid-salt slurry passes down into the restricted section 8 of the vaporizer 1, flows around the lower extremity thereof, which is spaced above the bottom of the desupersaturation chamber 2, and into the annular shaped chamber disposed about the restricted section 8. From the desupersaturation chamber 2 the slurry concentrate passes into pipe 6 and the cycle of operations is repeated. Discharge and overflow of concentrated liquor passes through pipes 11 and overflow pipe 12 respectively.

The process of the invention is conducted by evaporating a phosphoric acid solution containing from 35% to 45% phosphoric acid as $H_3PO_4$ (or 25% to 32% calculated as $P_2O_5$); 1 to 5.0% sulfuric acid, 1 to 4% hydrofluosilisic and fluosilicates and up to 1.5% to 2%, of dissolved calcium sulfate (all in percent by weight), giving a phosphoric acid concentration of between 45% to 60% $P_2O_5$. The evaporation may be conducted in a single evaporator, as shown, or in a suitable multiple effect evaporator system. In the single effect evaporation of the drawing the weak phosphoric acid is fed into the system via pipe 5 and forced by pump 3 into vaporizer 1 until approximately the liquid level shown is reached. Heat is then introduced into the circulating stream, e.g. from steam equivalent to an amount that will provide the sensible heat required and in an amount sufficient to vaporize the water to effect the aforesaid evaporation.

The finished product, concentrated phosphoric acid, can be discharged either through connection 11 or 12 or both connections at the same time. The liquor volume between pump suction and outlet connection 12 provides a decanting zone for the following purpose: Crystalline solids produced during concentration can be retained in the circulatory system in order to obtain the necessary surface for desupersaturation. This means that finished product discharged through 12 will then be essentially free of crystalline solids and if need be, additional quantity of product can be pumped away through nozzle 11.

In starting up the process, calcium sulfate crystals as well as crystals of other solids like fluosilicates, can be added from the outside, that is, when the system is started up with fresh dilute acid solution.

The apparatus such as that illustrated in the drawing is operated by way of example by passing into the evaporator-crystallizer 1 through pipe 5 a weak phosphoric acid solution containing about 30% $P_2O_5$ by weight, 1.7% $CaSO_4$, 3.0% fluosilicates and 2.5% $H_2SO_4$ (which when concentrated by processes of the art would give a concentrated acid containing 50% $P_2O_5$, 0.35% $CaSO_4$, 0.3% fluosilicates and 4.2% $H_2SO_4$ until the crystallizer 1 is filled to the line indicated in the drawing, i.e. about the level of the inlet pipe 7 to the crystallizer 1. Circulation of the solution is increased to give a flow of about 30 to 80 gallons per minute per square foot of the desupersaturation chamber 2 while at the same time an aqueous phosphoric acid solution of monocalcium phosphate containing 23% monocalcium phosphate 20% phosphoric acid as $P_2O_5$ is introduced through line 6 into the circulating stream. When the concentration of the acid is increased to about 52% $P_2O_5$ it is withdrawn through outlet 12. The rate of input of monocalcium phosphate into the system is then adjusted so that the amount introduced is substantially equal stoichiometrically to the sulfuric acid content of the feed to the crystallizer. The concentrated acid product of this process, quite in contrast with the product of the art contains 52% $P_2O_5$ or higher 0.3% $CaSO_4$, 0.3% fluosilicates and less than 0.5% $H_2SO_4$.

Another important feature of the invention resides in the method of carrying out the concentration in order to avoid deposits on the crystallizer surfaces, heater surfaces, or other parts of the apparatus. This is accomplished by controlling supersaturation of the calcium sulfate and fluosilicates which are responsible for the aforesaid undesirable results. This supersaturation is released by discharge to crystals which grow and nucleate, leaving a relatively desupersaturated liquor to pass through the apparatus. More specifically, calcium sulfate and other crystals are suspended in the solution and in sufficient quantity to offer necessary crystalline surface for the release. It has been found that the quantity of crystals in the circulating suspension available for growth and desupersaturation must be at least five times the amount of calcium sulfate and fluosilicates introduced with the feed per hour in order to avoid incrustations on the heating surfaces.

In addition to the suspension of a certain quantity of crystals in the solution, the supersaturated liquor should have sufficient time of contact with the solid in order to reduce supersaturation effectively. With the quantities of crystals available for growth indicated above, i.e., at least 500 lbs. of such crystals per 100 lbs. of crystals produced per hour, at least 50 gallons of liquor volume should be available in the system per 100 lbs. of water vaporized per hour. This is referred to in the specification and claims as desupersaturation volume.

To reduce the amount of free sulfuric acid, the phosphate salt and preferably a monocalcium phosphate solution is added through connection 14. Monocalcium phosphate (preferably produced by dissolving rock in phosphoric acid) is soluble in excess phosphoric acid and by adding this solution in controlled amounts through pipe 14, the free sulfuric acid in the concentrated acid is reduced to below 1% by weight, the monocalcium phosphate reacting with the free sulfuric acid according to reactions A, B and C above. Note that the $SO_4$ ion is converted to crystalline calcium sulfate and this has the advantage of forming additional crystal surface to desupersaturate the liquor during the concentration process.

The partial pressure of water vapor above the evaporating phosphoric acid is, moreover, increased by reducing sulfuric acid content through the addition of the phosphate salts or the evaporating temperature is reduced at the same $P_2O_5$ concentration by reducing the "free" $H_3PO_4$. This temperature reduction results in further economies in operation. Thus evaporation temperatures 10 to 15° F. lower can be used without a reduction in $P_2O_5$ concentration or operation can be conducted at the same temperature as before with an increase in $P_2O_5$ concentration. In either case an increase in operating efficiency results.

It is further recommended in order to maintain freedom from deposition to provide adequate circulation and agitation, i.e., efficient contact between supersaturated slurry and crystals. Means should accordingly be provided whereby the supersaturated liquor is brought into direct contact with the suspended crystalline solids. An efficient way to accomplish close contact is to provide for a relatively high rate of circulation, especially in the desupersaturation chamber 2. A rate of circulation equivalent to at least 25 gallons per minute per square foot of the total cross sectional area of the desupersaturation chamber should be used.

Many changes can be made in the process of the invention without departing from its scope. For example: a wide range of conditions and reactants may be used in the preparation of the free sulfuric acid containing weak phosphoric acid solution prior to its concentration; concentrations of monocalcium phosphate solutions or their equivalents can vary through a broad range; the addition of the monocalcium phosphate or its equivalent, to the free sulfuric acid containing weak phosphoric acid, can be carried out before or during the evaporation step; evaporation, distillation or other well known means of concentration can be used; and such operations will fall within the purview of the invention as covered by the appended claims.

I claim:
1. In an improved process for the preparation of phosphoric acid by the wet process wherein the concentration of phosphoric acid is effected with reduced deposition of calcium sulfate and fluosilicate crystals and with reduced corrosion, the steps which comprise:

a. dissolving tricalcium phosphate from phosphate rock, with phosphoric acid,
b. adding sulfuric acid to the resulting solution to effect reactions in accord with the following equations and to give, at least, 1% by weight of excess sulfuric acid:

$$H_2SO_4 + CaH_4(PO_4)_2 = CaSO_4 + 2H_3PO_4$$
$$H_2SO_4 + CaHPO_4 = CaSO_4 + H_3PO_4$$
$$3H_2SO_4 + Ca_3(PO_4)_2 = 3CaSO_4 + 2H_3PO_4$$

c. adding a sufficient amount of a salt selected from the group consisting essentially of mono-, di-, and tri-calcium phosphate to the resulting phosphoric acid solution to reduce the sulfuric acid content to less than 1% by weight.
d. concentrating the phosphoric acid to more than 32% by weight $P_2O_5$ and thereby supersaturating the solution with respect to calcium sulfate and fluosilicates,
e. and releasing the supersaturation of calcium sulfate and fluosilicates caused by the addition of the salt selected from the group by the presence in the supersaturated solution of a slurry of crystalline solids of calcium sulfate and fluosilicate crystals.

2. The process of claim 1 in which the solution obtained in step "b" contains 25% to 32% $P_2O_5$, by weight, and 1% to 5%, by weight, of sulfuric acid.

3. The process of claim 2 in which the phosphoric acid in step "d" is concentrated to from 45% to 60% by weight of $P_2O_5$.

4. The process of claim 1, step "e," in which the slurry of crystals added and available for growth and desupersaturation is at least five times the amount of calcium sulfate and fluosilicates introduced with the feed per hour.

References Cited in the file of this patent
UNITED STATES PATENTS

| | | |
|---|---|---|
| 1,836,672 | Larsson | Dec. 15, 1931 |
| 2,013,970 | Moore | Sept. 10, 1935 |
| 2,887,362 | Lee | May 19, 1959 |
| 2,897,053 | Svanoe | July 28, 1959 |
| 2,905,535 | Atkin et al. | Sept. 22, 1959 |